(No Model.)
M. O. FELKER.
FISHING ROD AND CANE.
No. 465,254. Patented Dec. 15, 1891.
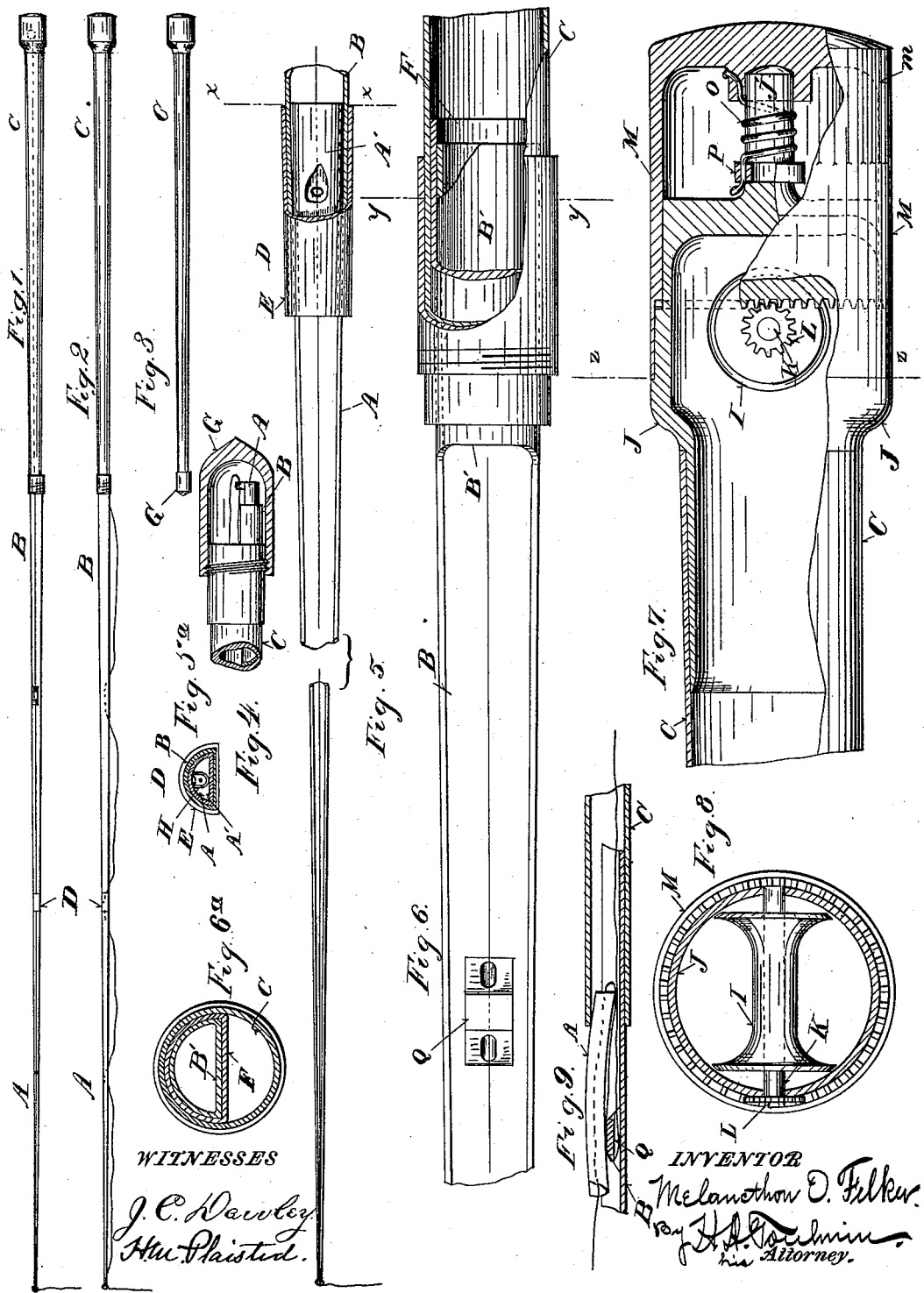
WITNESSES
J. C. Dawley
Wm. Plaisted.
INVENTOR
Melancthon O. Felker.
By H. A. Goodwin
his Attorney.

UNITED STATES PATENT OFFICE.

MELANCTHON O. FELKER, OF SPRINGFIELD, OHIO.

FISHING-ROD AND CANE.

SPECIFICATION forming part of Letters Patent No. 465,254, dated December 15, 1891.

Application filed August 20, 1891. Serial No. 403,266. (No model.)

*To all whom it may concern:*

Be it known that I, MELANCTHON O. FELKER, a citizen of the United States, residing at Springfield, in the county of Clark and State of Ohio, have invented certain new and useful Improvements in Fishing-Tackle and Walking-Canes, of which the following is a specification, reference being had therein to the accompanying drawings.

My invention relates to certain new and useful improvements in combined fishing-tackle and walking-canes.

My improvements have reference to a telescopic connection of the sections constituting the fishing-rod and to a peculiar form of said sections, whereby greater flexibility and lightness are secured and undue friction on the fish-line is avoided; have reference to attaching the fish-line to said rod and the interior location of the reel; have reference to a handle forming a cap for the stock or cane section and adapted to drive said reel; have reference to means for disconnecting said driving-cap from said reel to allow of unwinding from the latter; have reference to means for preventing the rattling of the rod-sections when uncoupled and inclosed within the cane-section, and have reference to other points of detail hereinafter described and claimed.

In the accompanying drawings, on which like reference-letters indicate corresponding parts, Figure 1 represents an under side view of the fish-rod coupled; Fig. 2, a side view of the same; Fig. 3, a view of the device adapted for use as a cane, the rod-sections being inclosed within the stock or cane-section; Fig. 4, an enlarged view of the smaller end of the stock, showing the ends of the rod-sections projecting therefrom and covered by a tip; Fig. 5, portions of the first or smaller rod-section and its joint with the next or larger second section; Fig. 5$^a$, a cross-section on the line $x\,x$ of Fig. 5; Fig. 6, an inside view of the second section and its joint with the next larger or stock-section; Fig. 6$^a$, a cross-section on the line $y\,y$, Fig. 6; Fig. 7, a longitudinal sectional and side view of the large end or handle of the stock; Fig. 8, a cross-section on the line $z\,z$, Fig. 7; and Fig. 9 a longitudinal sectional view showing the rod-sections in the act of sliding within the cane-section.

The letter A designates the outer or smallest section of the fish-rod, the letter B the intermediate section, and the letter C the stock or cane section when the rod is composed of three sections, as is conveniently illustrated. The outer sections are preferably composed of spring-steel or other suitable spring material formed in a substantially semicircular shape of cross-section, being practically one-half of a tapering tube, whereby the flexibility of the sections is increased, lightness and strength are secured, and undue friction on the fish-line is avoided, as will presently be described. The connection between the sections is preferably by a sliding joint, the one at D being formed by bridging over the end of the section A by a bracing-piece A', fitting within the tapering outer end of the section B, preferably strengthened and inclosed by a sleeve E, which prevents the sections from spreading and strengthens the joint. As seen from Fig. 5$^a$, the sections fit tightly one within the other when drawn out to the proper length, and the cross-section of the joint is semicircular and flat. The edges of the semicircular portion beyond the joint are strengthened by being turned in or beaded, as shown in Fig. 5. The next larger or intermediate section B has a similar bracing-web B' at its larger end and fitting within a corresponding sleeve F, mounted within the tip end of the stock which is round, as shown in Figs. 6 and 6$^a$, whereby the section B forms a corresponding joint with the section C. The taper of the parts will effect a close engagement at the joints and the re-enforcing sleeves or collars prevent bulging and stiffen the joints. The outer sections may be readily slipped one within the other and both within the stock C, the tip end of which is screw-threaded or otherwise adapted to receive a tip G, engaged with the same to cover the projecting ends of the rod-sections and prevent injury to the same when the device is used as a walking-cane, as illustrated in Figs. 3 and 4. This shape of rod gives a large amount of flexibility and lightness combined with strength and admits of mounting the fish-line along the inside of the same, where it is supported at convenient points by the usual loops H and is carried within the stock C to its connection with a reel I, mounted in the larger end of said stock, preferably in the handle J, which may be enlarged to a suitable size for said reel. The axle K is provided with a pinion L, meshing with teeth formed on the edge or other convenient portion of a rotatable cap M, slidingly mounted on the handle J and adapted to be rotated by the hand, whereby the reel may be wound up and the line drawn in. It will be observed from Figs. 7 and 8 that the ratio between the pinion and the teeth on the cap is such as to multiply the revolutions of the reel, or, in other words, the rotation of the cap M will effect, say, four revolutions of the reel to one of the cap, as illustrated. If desired, the cap M may have a milled surface at $m$ or be otherwise adapted to the grasp of the hand.

In order to allow the reeling off of the line, the pinion and its driving-gear are temporarily disconnected by sliding the cap axially; and the return of the cap to meshing engagement with the reel-pinion is effected by a spring O, secured to the cap by one end and at the other to a rotatable collar P, mounted on a stem J' from the handle J, the collar freely rotating with the cap, but exerting a tension thereon through the said spring O to preserve its operative connection with the reel, except when moved axially to release the reel-pinion. The lip-extension of the cap M, projecting beyond the gear-teeth, prevents the entrance of dust thereto when this axial movement takes place. Normally, however, only a line is formed by the meeting surfaces of the cap, and handle on the outside presenting a neat appearance and indicating nothing of the interior mechanism. Other means for keeping the cap in normal engagement with the reel-pinion may be employed; but the above is a convenient mode of construction.

The stock forming the cane-section may be formed of sheet metal or otherwise, and the handle J is conveniently secured thereto by inserting the shouldered reduced portion thereof into the stock C, as shown in Fig. 7. It will be observed that the reel and its operative parts are inclosed within the handle end of the stock, and that when used as a cane the device presents no indications of its capability for use as a fishing rod and tackle. The fish-line is entirely out of sight and the end of the cane tipped to prevent the dislodgment of the inclosed sections.

In order to prevent the rattling of the sections within the stock, I provide a wedge-shaped piece Q upon the middle section B, which piece may also be used to support the line. When the sections are telescoped in uncoupling the joint, this projection will press outward the section A against the sides of the inclosing stock, as indicated in Fig. 9, and, by the spring of the material, keep the sections tightly pressed together and take up the slack or difference in size when in their telescoped position. It will be seen, also, that the slack in the line is taken up at the same time, thus requiring little or no winding of the reel when the joints are uncoupled and the device adapted for use as a cane.

I am aware that other fish-rods of tubular form having the line located within them and running to a reel located at the butt have been employed. It will be observed that my device overcomes a very practical defect in this tubular form of rod—viz., the friction of the line along the interior of the tube, which rapidly abrades the line. By my semi-tubular open form of rod the line is only supported at intermediate points and suffers no more frictional contact than if attached to the outside of a rod in the usual manner, while it is protected and contained within the device entirely, as above described and illustrated.

Having thus fully described my invention, what I claim as new, and desire to secure by Letters Patent, is—

1. In a combined cane and fishing-tackle, the combination, with semi-tubular rod-sections having the edges beaded and the joining ends braced by cross-webs to give stiffness thereto, of the tapering form of said sections allowing of telescoping one section within the other, and the semi-tubular construction giving flexibility to the fish-rod and lightness to the cane when the rod is telescoped within the stock or cane section.

2. In a combined walking-cane and fishing-tackle, the combination, with the stock, of an enlarged handle engaged therewith, a reel mounted in said handle, a pinion thereon, a cap rotatably and slidingly mounted on said handle and having teeth on the edge thereof adapted to mesh with said pinion, a portion of the cap extending beyond said teeth to cover the same, and a flexible connection between said cap and said handle, adapted to preserve the meshing engagement of said pinion and cap-teeth, yet allow of temporary disengagement of the same, for the purpose described.

3. In a combined walking-cane and fishing-tackle, the combination, with a tubular section adapted to form the stock of a fish-rod, of one or more rod-sections adapted to be mounted on said stock to constitute a fish-rod and to be inserted within the same to form a cane, a protecting-tip for the smaller end of said cane, a reel mounted in the larger end of said stock, adapted to wind up a fish-line, a pinion on said reel, a cap slidingly and rotatably mounted on the handle end of said stock and having teeth adapted to mesh with said pinion, and means to effect the normal engagement of said pinion and cap-teeth, whereby the line may be wound up by rotating said cap and be allowed to unwind freely from said reel by unmeshing said pinion-driving cap by sliding the cap axially out of engagement therewith.

4. In a combined walking-cane and fishing-tackle, the combination, with a cane-section adapted to form the stock of a fish-rod, of a reel rotatably mounted within said stock, a piece constituting a cap for the handle M of said stock and adapted to rotate and slide axially thereon, gear connections between said cap and said reel, and a spring acting on said cap to effect the normal engagement of said gear mechanism, yet allow of sliding the cap axially to unmesh the same and free the reel.

5. In a combined walking-cane and fishing-tackle, the combination, with a tubular stock adapted to constitute a cane-section, of semi-tubular elastic sections adapted to be jointed together to form a fish-rod and adapted to be inclosed within the stock to form a cane, and a reel and adjunctive devices carried by said stock and adapted to constitute a fishing-tackle when the sections are jointed together.

6. In a combined walking-cane and fishing-tackle, the combination, with a tubular stock adapted to form a cane, of semi-tubular flexible sections having semicircular braced jointing ends, whereby tapering telescopic joints may be formed in said semi-tubular sections, a reel mounted in the larger end of said stock, means to guide a fish-line along the interior of said semi-tubular sections and stock to the said reel, whereby the frictional contact of the line on the fish-rod is avoided, and means to operate said reel to wind up said line.

7. In a combined walking-cane and fishing-tackle, the combination, with a tubular stock and semi-tubular rod-sections adapted to be inclosed therein, of a projection on one section adapted to be pressed against the adjacent section when the parts are inclosed in the stock, whereby the slack or play between the parts is taken up and they are prevented from rattling.

8. In a combined walking-cane and fishing-tackle, the combination, with a handle for the stock having a projecting stem provided with an annular groove, and a collar rotatably mounted therein, of a cap for said handle end rotatably and slidingly mounted thereon, and a spring forming an elastic connection between said collar and said cap, whereby the cap may be rotated freely and allow of axial movement.

In testimony whereof I affix my signature in presence of two witnesses.

MELANCTHON O. FELKER.

Witnesses:
H. M. PLAISTED,
WARREN M. MCNAIR.